(12) United States Patent
Weber et al.

(10) Patent No.: US 7,441,800 B2
(45) Date of Patent: Oct. 28, 2008

(54) STEERING WHEEL FOR A MOTOR VEHICLE

(75) Inventors: Helmuth Weber, Aschaffenburg (DE); Horst Muller, Florstadt (DE)

(73) Assignee: Takata-Petri AG (DE)

( * ) Notice: Subject to any disclaimer, the term of this patent is extended or adjusted under 35 U.S.C. 154(b) by 399 days.

(21) Appl. No.: 11/055,546

(22) Filed: Feb. 10, 2005

(65) Prior Publication Data
US 2005/0189159 A1 Sep. 1, 2005

(30) Foreign Application Priority Data
Feb. 10, 2004 (DE) .................. 10 2004 007 253

(51) Int. Cl.
*B60R 21/16* (2006.01)
(52) U.S. Cl. .................. 280/731; 200/61.54; 200/61.55
(58) Field of Classification Search ................. 280/731; 200/61.54, 61.55
See application file for complete search history.

(56) References Cited

U.S. PATENT DOCUMENTS

| | | | |
|---|---|---|---|
| 4,340,813 A | 7/1982 | Sauer | |
| 4,706,072 A | 11/1987 | Ikeyama | |
| 5,446,661 A | 8/1995 | Gioutsos et al. | |
| 5,769,085 A | 6/1998 | Kawakami et al. | |
| 5,855,144 A * | 1/1999 | Parada ..................... | 74/552 |
| 7,134,687 B2 * | 11/2006 | Breed et al. .................. | 280/735 |
| 2003/0067148 A1 | 4/2003 | Keutz | |
| 2003/0086588 A1 | 5/2003 | Shinada et al. | |

FOREIGN PATENT DOCUMENTS

| | | |
|---|---|---|
| DE | 40 23 109 A1 | 1/1992 |
| DE | 196 48 374 A1 | 6/1998 |
| DE | 201 16 618 U1 | 2/2002 |
| EP | 0 545 497 A1 | 6/1993 |
| GB | 2 171 547 A | 8/1986 |
| JP | 57 11133 | 1/1982 |
| JP | 63 79247 | 5/1988 |
| JP | 2000 203359 A | 7/2000 |
| JP | 2003 175783 A | 6/2003 |
| JP | 2003 195890 A | 7/2003 |
| JP | 2003 260988 A | 9/2003 |

OTHER PUBLICATIONS

European Search Report for EP 05 07 5255 dated Jun. 21, 2005; 5 pages.

* cited by examiner

*Primary Examiner*—Eric Culbreth
(74) *Attorney, Agent, or Firm*—Fitch, Even, Tabin & Flannery

(57) ABSTRACT

A steering wheel for a motor vehicle is provided having a hub element, a steering wheel rim, at least one steering wheel spoke for attaching the steering wheel rim to the hub element and at least one activation device which is arranged on the hub element, the steering wheel rim or the steering wheel spoke for controlling and/or regulating an assembly of a motor vehicle. The activation device is preferably embodied as an optical reflection sensor device with a functional face. Such a sensor device operates without mechanically moving parts and during the service life of the steering wheel it is independent of general scratching and soiling of its functional faces. In addition, the functionality of the measurement of distances and/or speeds of the objects located above the functional faces of the sensor device permits further functions to be integrated without requiring further separate devices in order to do so.

18 Claims, 3 Drawing Sheets

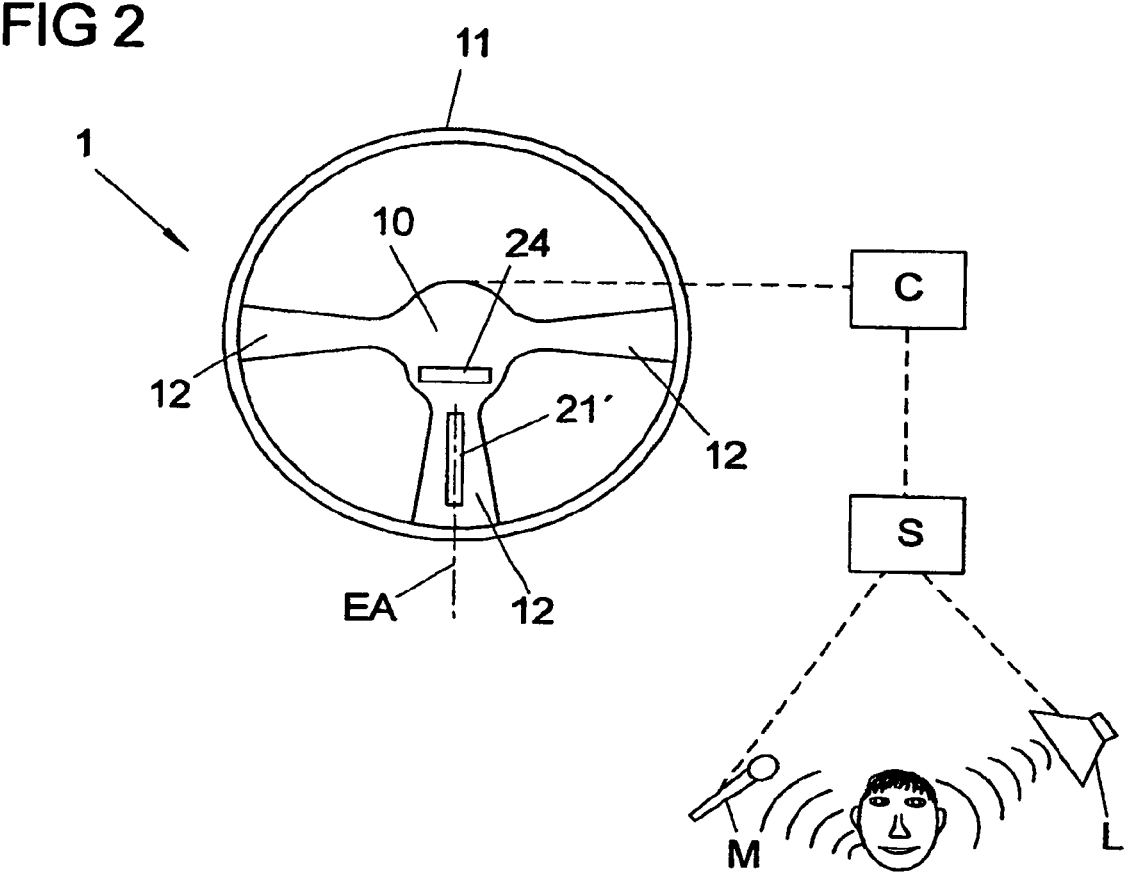
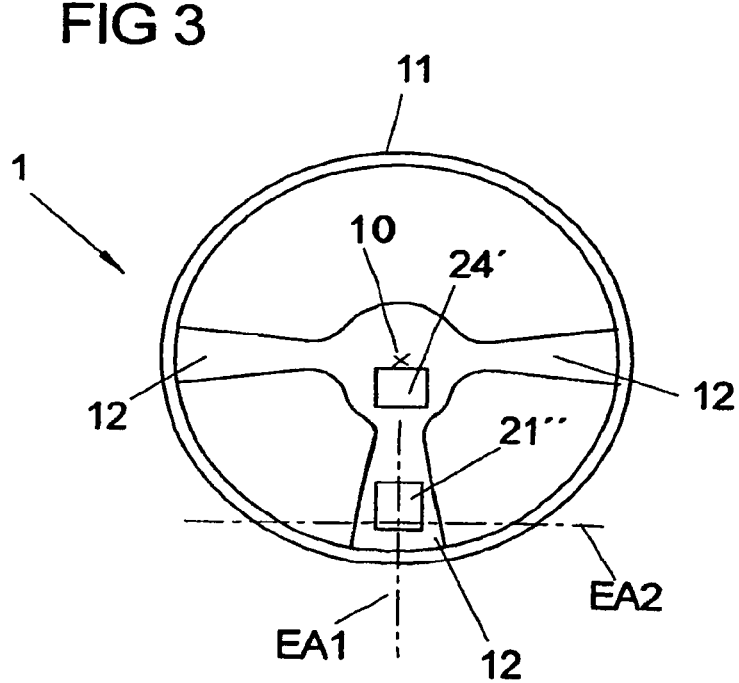

STEERING WHEEL FOR A MOTOR VEHICLE

FIELD OF THE INVENTION

The present invention relates to a steering wheel for a motor vehicle. In addition, the invention relates to a method using such a steering wheel.

BACKGROUND OF THE INVENTION

The prior art has disclosed motor vehicle steering wheels having a hub element, a steering wheel rim, at least one steering wheel spoke for attaching the steering wheel rim to the hub element and at least one activation device which is arranged on the hub element, on the steering wheel rim or on the steering wheel spoke and has the purpose of controlling and/or regulating a parameter of an assembly of a motor vehicle.

Arranging activation devices on the steering wheel itself enables the driver of a motor vehicle to control and/or regulate various parameters of assemblies of the motor vehicle while driving without having to take his hands off the steering wheel. This constitutes an important contribution to vehicle safety.

Customary parameters of motor vehicle assemblies which can be controlled and/or regulated by means of activation devices include, for example, functional parameters of the music system, of the air-conditioning system, of the navigation system and of the hands-free system of a mobile phone. However, basically all assemblies whose operator controls are so far away from the steering wheel that it is absolutely necessary for the driver to take his hand off the steering wheel to operate them can be controlled and/or regulated in an appropriate way.

With respect to the previous activation devices, a first disadvantage is that owing to their mechanical component they have a force/travel characteristic curve and are thus subject to mechanical wear. As a result, during the course of the service life of a motor vehicle the activation devices may be subject to functional impairments and faults. On the other hand, any activation device fulfills exclusively the function, permanently assigned to it, of enabling the driver of the vehicle to control and/or regulate a parameter of a motor vehicle assembly from the steering wheel. If further functions are to be implemented, further devices which are provided for that purpose are usually necessary.

SUMMARY OF THE INVENTION

An object of the present invention is to make available a steering wheel with at least one activation device, with the activation device having a maintenance-free and reliable function over the entire service life of the motor vehicle without increasing impairment occurring over the course of the service life. A further object of the invention is to provide a steering wheel with at least one activation device, which steering wheel has, in addition to the function of enabling the driver of a vehicle to control and/or regulate a parameter of a motor vehicle assembly, integrated at least one further functionality, thus permitting simpler and more cost-effective manufacture.

These objects are achieved by means of a steering wheel having the features described hereinafter.

According to the invention there is provision for the at least one activation device of the steering wheel to be embodied as an optical reflection sensor device. Such optical reflection sensor devices have a functional face which is embodied so as to be transparent to the light of a transmitted light source, usually an infrared LED. A detector device detects and analyzes the components of the transmitted light which are reflected, firstly, as they pass through the functional face and by an object located above or on the functional face.

Such mature sensor devices, for example the HALIOS system from the manufacturer ELMOS, have an additional compensation light source which is operated in an identically modulated fashion but with a phase shift with respect to the transmitted light source, and generates a second signal without interaction with the functional face or with external objects by means of the same detector device. The sum of the two generated signals is formed, with the operating current of the compensation light source being adjusted in such a way that the sum of the signals is zero if there is no reflection object arranged on or above the functional face. This zero sum signal is completely independent of incident extraneous light, scratching or soiling of the surface etc. Only a reflected component of the modulated transmitted light which occurs as a result of an object above the functional face gives rise to a signal and can be analyzed in terms of the distance of the object from the functional face and/or its approach speed. It goes without saying that at the same time different ranges for the distance measurement and/or speed measurement can be implemented depending on the design of the light source of the sensor device.

Such a sensor device operates without mechanically moving parts and during the service life of the steering wheel it is, as described above, independent of general scratching and soiling of the functional faces. For this reason, it is an activation device which ensures a permanent and continuously reliable function. In addition, the functionality of the distance measurement and/or speed measurement of the objects located above the functional faces of the sensor device permits further functions to be integrated without requiring further separate devices in order to do so.

Owing to the small amount of space which they require, the optical reflection functional faces can be arranged on all the components of the steering wheel, specifically the steering wheel rim and/or the steering wheel spokes and/or the hub element.

The at least one optical reflection sensor device is suitable, as explained above, not only for its function as an activation device which is influenced by the wishes of the driver of the vehicle, but also for measuring the parameters relating to the distance and/or the approach speed between the driver of the vehicle and the steering wheel independently of the wishes of the driver of the vehicle. In this way, the sensor device can be used not only for the function of controlling and regulating which is caused by the wishes of the driver of the vehicle, but also for determining the abovementioned parameters for the electronic safety system of the motor vehicle. In this case also, the feature of controlling and/or regulating a motor vehicle assembly, specifically the electronic motor vehicle safety system, is provided by the activation device. However, in contrast to the functionality described above, these control and/or regulating processes take place independently of the wishes of the driver of the vehicle.

It goes without saying that it is possible to provide a plurality of optical reflection sensor systems on the steering wheel, with said sensor systems respectively having the functionality which is "controlled by the driver's wishes", as mentioned above, or the functionality which is independent of the wishes of the driver of the vehicle or a combination of both functionalities.

It is advantageous to arrange the functional face of the sensor device in the steering wheel rim or on a steering wheel spoke in such a way that the driver of the vehicle reaches the functional face with one of his fingertips without having to take his hand off the steering wheel rim in order to do so. In this way, the driver of the vehicle can steer the vehicle and at the same time control and/or regulate parameters of a motor vehicle assembly by means of the sensor device. Of course the thumb counts as a finger in the sense of the present invention. The feature of the fingertip which is used within the scope of the present invention essentially comprises the region of the first part of the finger.

The sensor device is preferably embodied in such a way that the driver of the vehicle generates a switch-off or switch-on signal for a function of an assembly of the motor vehicle by tapping the functional face with a fingertip. Since the electronic evaluation system of the sensor device can differentiate between an object approaching without touching the functional face, in this case a fingertip, and the fingertip tapping on the surface or stroking the functional face, undesired malfunctions of the activation device can be effectively avoided. In addition to the avoidance of malfunctions mentioned above by virtue of a corresponding evaluation of measurement signals, it is advantageous to arrange the functional face of at least one sensor device in a depression in the steering wheel. The depression is embodied here in such a way that the possibility of the driver of the vehicle unintentionally touching the functional face with his hands during the process of steering is ruled out. This is appropriate as an additional measure in particular if the functional faces are arranged in areas of the steering wheel which the driver of the vehicle usually touches with his hands during the process of steering.

In one preferred embodiment of the steering wheel with a functional face which is provided in a depression there is provision for the functional face to have an apex region arranged in the lowest region of the depression and a first limb adjoining it on one side, and a second limb adjoining on the other side. In this context, the sensor device is preferably embodied in such a way that a driver of a vehicle actuates a control function and/or regulating function of a motor vehicle assembly by tapping the functional face in the apex region with a fingertip.

Furthermore there is advantageously provision for the sensor device to be embodied in such a way that the driver of the vehicle generates a first control signal and/or regulating signal of an assembly of the motor vehicle by moving his fingertip onto the first limb from the apex region, and a second control signal and/or regulating signal of an assembly of the motor vehicle by moving his fingertip onto the second limb from the apex region. This permits the sensor device of the steering wheel to be found and operated in a purely haptic fashion with undesired incorrect operations being made more difficult as a result of the functional face being countersunk in a depression. In this context, the first and the second limbs of the functional face are preferably embodied so as to be symmetrical with respect to one another.

In a further embodiment, the functional face of the sensor device is countersunk in a transverse direction with respect to a plane extending from the steering wheel rim, preferably perpendicularly with respect to this plane.

One preferred variant of the invention provides for the functional face of the sensor device to be arranged on a bulge of the steering wheel rim projecting in the direction of the hub element. Such bulges which are formed organically in the direction of the axis of rotation of the steering wheel starting from the contour of the internal diameter of the steering wheel rim are known from the prior art for motor vehicle steering wheels and have the purpose of providing the driver of the vehicle with the possibility of an alternative position for placing his hands on the steering wheel rim. This prevents the musculature of the hands of the driver of the vehicle from becoming fatigued.

A particularly preferred embodiment of the steering wheel provides for a second sensor device in the region above the axis of rotation of the steering wheel to be arranged symmetrically with respect to the sensor device in the straight-ahead position of the steering wheel. This results in one sensor device which is assigned to the left hand of the driver of the vehicle and one which is assigned to the right hand of the driver of the vehicle. A further embodiment of the steering wheel according to the invention has at least one functional face, extended along an axis of extent, of a sensor device, with this extended functional face being arranged on the steering wheel spokes and/or on the steering wheel hub, and the extension of the extended functional face being formed transversely with respect to the axis of extent in such a way that no significant movement of a fingertip of a driver of a vehicle transversely with respect to the direction of extent is possible. In this way, a functional face is made available whose operating direction, which corresponds to the axis of extent, can again be found in a purely haptic way by a driver of a vehicle without him having to divert his eyes from the traffic situation of the motor vehicle in order to do so.

The sensor device is preferably embodied here in such a way that a regulating function for an assigned parameter of a motor vehicle assembly can be actuated by the driver of the vehicle causing his fingertip to approach and/or touch the extended functional face. The parameter is then regulated by moving the fingertip in one or other direction along the direction of extent. If the extended functional face is arranged here on a steering wheel spoke which runs from the lower edge of the steering wheel rim in the straight-ahead position of the steering wheel, the direction for increasing the setting and the direction for decreasing the setting are given intuitively by the corresponding upward and downward movements of the fingertip on the extended functional face. In one preferred embodiment, the assigned parameter, to be regulated, of the motor vehicle assembly can be selected by speech-activated control by the driver of the vehicle by means of a motor vehicle speech recognition system. Additionally or alternatively the assigned parameter can be displayed visually on a display which is arranged on the steering wheel or in the dashboard region and/or can be reproduced audibly by means of a corresponding speech output of a motor vehicle on-board computer system.

A further preferred variant provides for the assigned parameter to be capable of being selected by the movement the fingertip on a functional face, extended along a plurality of axes of extent, of a further sensor device. In this context, the assigned parameter can be selected by moving the fingertip along a first axis of extent of the extended functional face and the selected, assigned parameter is regulated and/or controlled by moving the fingertip along a second axis of extent. In this context, it is thus possible both to select the desired assigned parameter and to control and/or regulate by the driver of the vehicle moving his fingertip on a two-dimensional field.

In addition, there is advantageously provision that selectable assigned parameters can be visually recognized by the driver of the vehicle on a selector display which is arranged on the steering wheel or in the dashboard region, the movement of the fingertip on the extended functional face controlling a cursor on the selector display and the selection of a desired assigned parameter being possible by moving the cursor onto the desired assigned parameter which is displayed on the selector display and subsequently tapping on the extended functional face using the fingertip.

In a further preferred embodiment, a plurality of sensor devices with functional faces are arranged on the steering wheel rim and/or on the steering wheel spokes in such a way that regions in which a driver of a vehicle touches or grasps the steering wheel with his hands can be detected. As a result, the information which is important for the electronic safety system of the vehicle can be acquired by means of the gripping position of the hands of the driver of the vehicle on the steering wheel. As already described, the invention is also concerned here with the process of controlling and/or regulating independently of the wishes of the driver of the vehicle.

As already explained at the beginning, the optical reflection sensor device is also suitable for determining the parameters with respect to the position and/or the approach speed of the upper part of the body of the driver of the vehicle in relation to the steering wheel. For this reason, the use of a steering wheel according to the invention makes possible a method in which the aforesaid parameters are determined and passed on to the electronic safety system of the vehicle, with the parameters influencing, in particular in the event of a crash of the motor vehicle, the decision of the electronic safety system as to whether, and in what way, a steering wheel airbag and/or side airbags which are assigned to the driver of the vehicle are triggered.

The term upper part of the body of the driver of the vehicle always also includes the head of the driver of the vehicle.

Further properties and advantages of the invention are explained with respect to the description of the following preferred exemplary embodiment, in which:

BRIEF DESCRIPTION OF THE DRAWINGS

FIG. 2 shows a plan view of a second embodiment of the steering wheel;

FIG. 3 shows a plan view of a third embodiment of the steering wheel;

DETAILED DESCRIPTION OF THE PREFERRED EMBODIMENTS

Figure 1A:
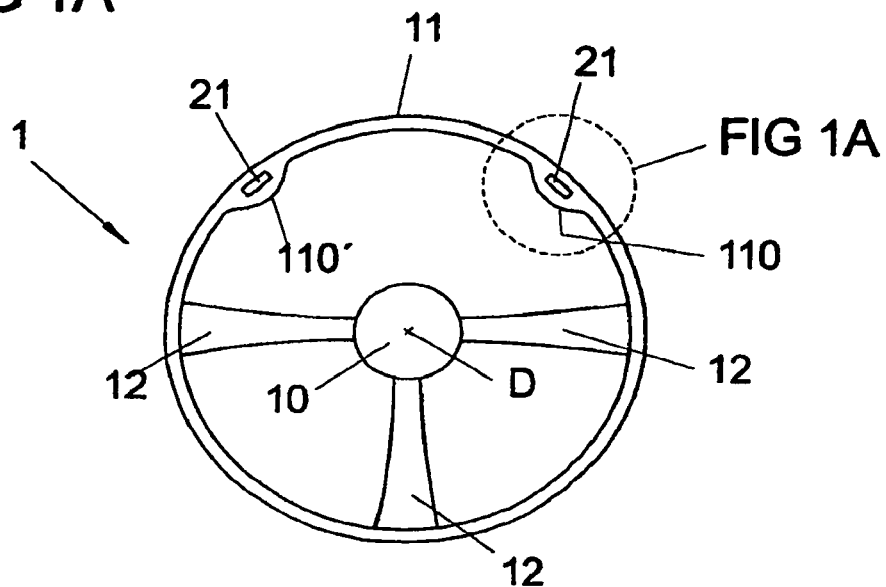
FIG. 1A shows a first embodiment of the steering wheel.

The first embodiment of the steering wheel 1 which is illustrated in FIG. 1A comprises an annular steering wheel rim 11 with an outer contour which is essentially circular. This steering wheel rim 11 is attached, fixed in terms of rotation, to the hub element 10 arranged in the center of the circular outer contour of the steering wheel rim 11 by means of three steering wheel spokes 12 which start from the steering wheel rim 11 and are directed inward.

FIG. 1A shows the hub element 10 in a circular shape in a plan view. The outer shape of the hub element 10 is influenced, on the one hand, by the fact that it usually accommodates an airbag module. Furthermore, the visual appearance which is expressed in particular in its geometric shape plays an important role for the design in the passenger compartment of the vehicle. Any other geometric embodiment of the hub element 10 which departs from the illustration selected in FIG. 1A is also covered by the invention.

The same applies to the geometric design and to the number of steering wheel spokes 12. In the first embodiment of the steering wheel 1 according to the invention only three steering wheel spokes 12 are provided by way of example.

Figure 1B:
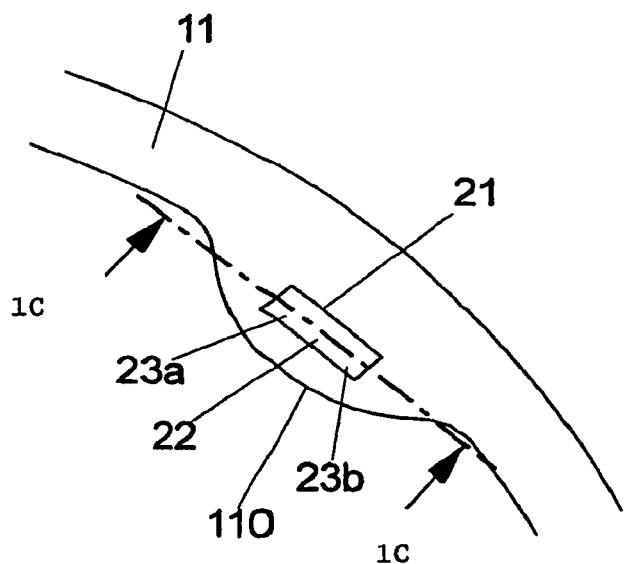
FIG. 1B shows a detail of the steering wheel from FIG. 1A.

The steering wheel rim 11 has a first widening of the steering wheel rim 11 in a certain section which is aligned with the hub element 10 and embodied as a bulge 110. FIG. 1B shows in detail how the contour of the first bulge 110 protrudes from the circular inner contour of the steering wheel rim 11 in a continuous organic fashion in the form of an extended bubble and merges, again in a continuously organic fashion, with the circular inner contour of the steering wheel rim 11. The first bulge 110 is dimensioned in such a way that when the first bulge 110 is gripped by the hand of a driver of a motor vehicle, the ball of the thumb comes to rest at least partially on the upper side of the bulge 110, with the underside of the thumb being supported on the edge of the bulge 110 which drops away toward the upper section of the steering wheel 1. This ensures pleasant haptics for the driver of the vehicle when the latter grips the steering wheel rim 11 in the region of the first bulge 110. The axially symmetrical design of the first bulge 110 which is illustrated is not absolutely necessary for this, but instead an asymmetrically shaped bulge 110 can also ensure good adaptation to the hand of a driver of a vehicle.

The first bulge 110 is, as illustrated in FIG. 1A, preferably arranged in the upper half of the steering wheel rim 11 viewed from the hub element 10. In this upper half of the steering wheel rim 11, a second bulge 110' is also provided. The second bulge 110' is arranged here in a mirror-inverted fashion with respect to the first bulge 110 in the upper half of the steering wheel rim 11 and also corresponds to the first bulge 110 in its dimensions. The statements made above thus also apply equally to the first bulge 110 and to the second bulge 110'.

In the detailed view in FIG. 1B it is clear that an optical reflection functional face 21, which is rectangular in plan view, of a sensor device is provided in the region of the first bulge 110. The infrared light sources and detectors which are necessary to operate the functional face 21 can be arranged, on the one hand, underneath the functional face 21 in the first bulge 110 of the steering wheel rim 11. On the other hand, it is possible to arrange the infrared light sources at another location in the steering wheel rim 11, the steering wheel spokes 12 or the hub element 10, with the emitted infrared light and the infrared light which is reflected above the functional face 21 being guided by means of integrated optical or fiber waveguides which are suitable for this purpose, preferably POF (plastic optical fiber), to the functional face 21 and guided back from the functional face 21.

Figure 1C:
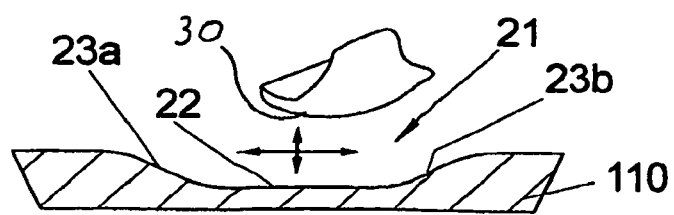
FIG. 1C shows a cross section along the line 1C-1C from FIG. 1B.

So that an unintentional activation of the sensor device does not occur during the steering process of the steering wheel 1 as a result of the functional face 21 being unintentionally touched, the functional face 21 is arranged in a depression. The depression is directed essentially transversely with respect to the plane extending through the steering wheel rim 11. This is clear in the sectional view which is shown in FIG. 1C along the line 1C-1C from FIG. 1B.

The functional face 21 which is arranged in the depression has, in this context, an apex region 22 which is arranged in the center in the depression and by touching which it is possible to actuate the sensor device. The apex region 22 is joined on the two sides by a first limb 23a and a second limb 23b which are embodied so as to be symmetrical with respect to one another. These limbs are each arranged on the rising edges of the depression, along the axis of extent (illustrated as the line 1C-1C in FIG. 1B) of the functional face 21 which is of rectangular design.

The depression is embodied in such a way that when the first bulge 110 is gripped by the hand of a driver of a vehicle as described above, the hand does not come into contact with the apex region 22 of the functional face 21. The depression is of sufficiently wide construction transversely with respect to the axis of extent 1C-1C for a fingertip 30, in particular the tip of the thumb, of the driver of the vehicle to fit into the depression. The driver of the vehicle can thus touch the apex region 22 of the functional face 21 with his fingertip 30 in order to actuate the sensor device. After the apex region 22 has been touched, the driver of the vehicle can generate a first or second control signal and/or regulating signal by moving his fingertip 30 in the direction of the first limb 23a or of the second limb 23b. The control signal may lead, for example, to a change in the functional state of a motor vehicle assembly by switching the motor vehicle assembly on or off.

The control process or regulating process can be perceived haptically here by the driver of the vehicle by means of the first limb 23a or second limb 23b which is respectively arranged on a rising edge of the depression. For this reason, this embodiment of the steering wheel according to the invention permits the control process and/or regulating process which has been performed by the driver of the vehicle to be carried out exclusively by means of haptic perception. Firstly, one of the two bulges 110, 110' can be sensed by sliding a hand along the steering wheel rim. A finger then slides over the surface of the bulge as far as the depression, touches the apex region 22 of the functional face 21 which is arranged in the depression, and as a result activates the sensor device and brings about the desired control process and/or regulating process, as illustrated above, also by means of haptic perception via the fingertips 30 of the driver of a vehicle. For this reason, during all these actions a driver of a vehicle is not reliant on the visual perception of the steering wheel 1 at any time and consequently does not need to divert his eyes from the traffic situation at any time.

On the one hand, fixed control and/or regulating functions can be assigned to the two functional faces 21 provided on the bulges 110, 110'. For example, the volume control of the hi-fi system of the motor vehicle can be assigned to one functional face and switching over between radio transmitters or titles of a music medium which is being played can be assigned to the other functional face. However, on the other hand it is also conceivable to assign functions which can be selected by the driver of the vehicle to one or both functional faces 21. This can be implemented, for example, by means of a speech-activated controller.

It goes without saying that other geometric shapes of the depression and of the functional face 21 situated therein are also covered by the invention. A simple switch without a regulating function can be implemented, for example, as a circular functional face which is arranged in a depression on the front or rear side of a steering wheel spoke 12. The spatial position of the functional faces 21 can be respectively sensed, without looking, by the driver of the vehicle by means of the depressions. An essential feature for the arrangement of a functional face 21 in a depression is in each case merely the fact that the depression has a structure which is such that unintentional activation of the sensor device by the steering movements of the driver of the vehicle is ruled out.

FIG. 2 shows a second embodiment of the steering wheel 1 according to the invention. The basic design of the steering wheel 1 corresponds to that shown in FIG. 1A. The statements made with respect to FIG. 1A therefore apply correspondingly to the matching features. Identical components are provided with identical reference symbols.

In contrast to the first embodiment of the steering wheel 1, a sensor device with an extended functional face 21' is not arranged in the region of a bulge on the steering wheel rim 11 but rather on a steering wheel spoke 12. If the steering wheel spoke 12 is one which is grasped by the hands of a driver of a vehicle during customary steering movements owing to the arrangement of said steering wheel spoke 12, the arrangement of the extended functional face 21' in a depression is not necessary.

With the steering wheel which is shown in FIG. 2, all that is probable is that a driver of a vehicle grasps the two horizontally arranged steering wheel spokes 12. For this reason, there is no need for a depression for preventing unintentional control and regulating processes for the extended functional face 21' which is arranged on the lower vertical steering wheel spoke 12.

In addition, through a corresponding adaptation of the evaluation software of the sensor device it is possible for the functional face 21' to be actuated only after a defined contact time of a fingertip 30 of the driver of the vehicle on a defined actuation area of the extended functional face 21'. In this way it is also possible to avoid inadvertent touching of the extended functional face 21' bringing about an undesired control process or regulating process.

The extended functional face 21 extends in a rectangular shape along an axis EA of extent running radially from the axis D of rotation of the steering wheel 1 outward via the lower steering wheel spoke 12. Starting from a centrally arranged actuation area, the driver of the vehicle can generate a control signal and/or regulating signal for an assigned parameter of a motor vehicle assembly by moving a fingertip 30 upward or downward (in the straight-ahead position of the steering wheel).

A display 24 which is arranged on the hub element 10 may be provided for displaying that parameter of a motor vehicle assembly which is currently assigned to the extended functional face 21. The assigned parameter is represented on this display 24 in a way which is clearly recognizable by the driver of the vehicle. Preferably displays which require little installation space, in particular film displays manufactured from OLED (Organic Light-Emitting Diodes) systems are suitable for this.

For the selection of the assigned parameter by the driver of the vehicle it is possible, for example, to provide a speech-activated control device S which is equipped with a microphone M and which interacts with the motor vehicle on-board computer C. In this way it is possible in particular to perform comprehensive control processes and regulating processes for the functions of the hi-fi system, of the navigation system, of the telephone system and/or of the air conditioning system in combination with the speech-activated controller with a slide controller which is embodied as an extended functional face 21'.

It would also be possible to arrange a further optical reflection sensor device with a functional face 21 on the steering wheel 1 by means of which it is possible to switch over between the various assigned parameters of the extended functional face 21'. The respectively assigned parameter can be recognized by the driver of the vehicle again by means of a display 24 and/or a speech-activated control device S, equipped with a loudspeaker, of the motor vehicle on-board computer C.

FIG. 3 illustrates a third embodiment of the steering wheel 1 according to the invention. The basic design of the steering wheel 1 corresponds to that shown in FIGS. 1A and 2. The preceding statements therefore apply correspondingly to the matching features. Identical components are provided with identical reference symbols.

In contrast to the first two embodiments of the steering wheel 1, in the third embodiment of the steering wheel 1 *a* sensor device is provided with a functional face 21" which extends on the lower steering wheel spoke 12 as an extended functional face 21" along a first axis EA1 of extent and a second axis EA2 of extent which is arranged perpendicularly with respect to the first axis. The first axis EA1 of extent starts from the axis D of rotation of the steering wheel 1 and runs in the radial direction via the lower steering wheel spoke 12 to the steering wheel rim 11. The second axis EA2 of extent runs perpendicularly with respect to the first axis EA1 of extent, essentially parallel to a plane extending through the steering wheel rim 11.

The functional face 21" which is extended in the form of a touch pad makes it possible, for example by moving the fingertip 30 along the lower or upper edge of the tableau parallel to the second direction of extent, to select the parameter which is to be controlled and/or regulated for a motor vehicle assembly which is assigned to the extended functional face 21". The assigned parameters which change during the movement along the edge of the touch pad can be seen by the driver of the vehicle on a display device 24' which is assigned to the hub element. When the driver has reached the desired parameter, the parameter is controlled and/or regulated by moving his finger along the first axis EAl of extent.

It is also conceivable to construct the extended functional face 21" with a functionality similar to a track pad of a portable computer. That is to say the movement of the finger on the extended functional face 21" moves a cursor which is represented on the display device 24'. The assigned parameters which can be selected by moving the cursor onto the desired parameter and "clicking" on this parameter by a touching movement of the finger are also represented on the display device 24'.

It goes without saying that the display device 24' could also be arranged in the dashboard region of the motor vehicle. The extended functional face 21" can also be combined with a speech-activated controller S of an on-board computer C of the motor vehicle in a way corresponding to the second embodiment of the steering wheel shown in FIG. 2.

Figure 4:
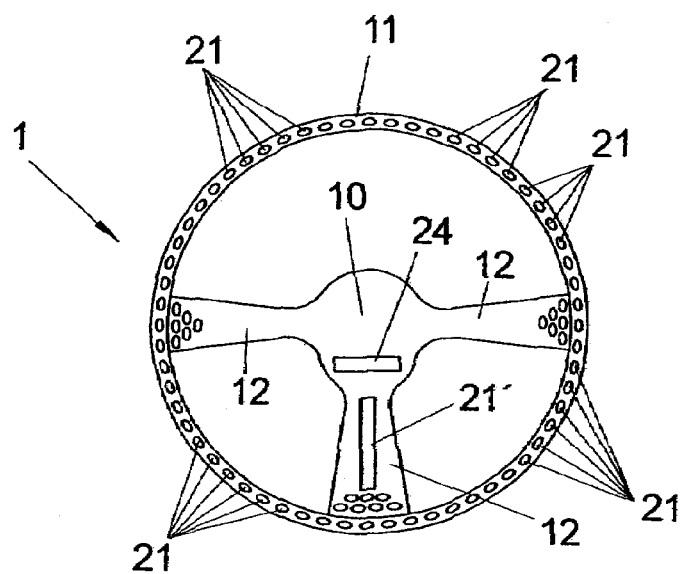
FIG. 4 shows a plan view of a fourth embodiment of the steering wheel.

A fourth embodiment of the steering wheel according to the invention is illustrated in FIG. 4. Said embodiment corresponds largely to the second embodiment shown in FIG. 2 so that reference is made to the statements there.

In contrast to the second embodiment of the steering wheel shown in FIG. 2, a large number of sensor devices with functional faces 21 are additionally arranged along the circumference of the entire steering wheel rim and in adjacent areas on the steering wheel spokes 12 in the fourth embodiment.

In contrast to the functional faces 21 which are described above and are arranged on the steering wheel rim, these functional faces 21 are not provided in depressions because contact between the hands of the driver of the vehicle and the functional faces is desired. In this way it is possible to generate signals which reflect the position of the hands of the driver of the vehicle on the steering wheel 1. These signals serve as information for the electronic safety system of the motor vehicle. For example, a visual and/or audible warning signal may be generated if there is no contact, or too little contact, with the steering wheel when the vehicle is traveling.

As already explained, the optical reflection sensor devices with their functional faces 21 which are arranged on the steering wheel are suitable not only for the function influenced by the wishes of the driver of the vehicle but also for measuring the distance between the steering wheel and the upper part of the body of the driver of the vehicle independently of the wishes of the driver of the vehicle.

Figure 5:
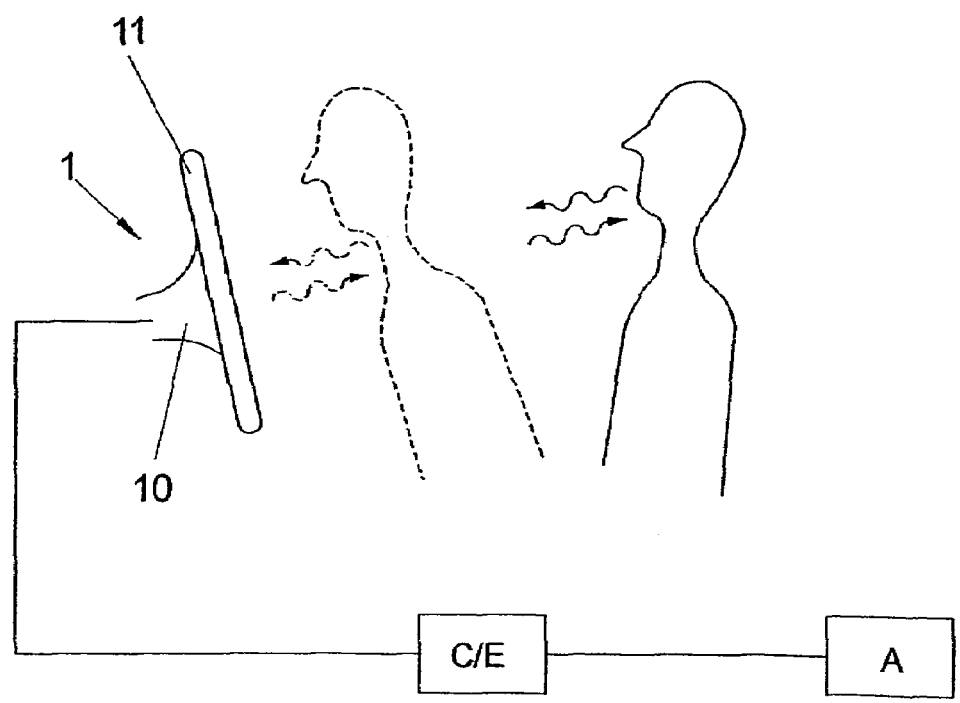
FIG. 5 shows the schematic illustration of a method using a steering wheel according to the invention.

Such a method using a steering wheel according to the invention is illustrated schematically in FIG. 5. The upper part of the body of the driver of the vehicle is illustrated in a first position (shown by unbroken lines) which is further away from the steering wheel 1, and a second position (illustrated by broken lines) which is closer to the steering wheel. Both positions can be detected by means of the sensor device which is arranged on the steering wheel but concealed in the side view, by detecting the infrared radiation reflected at any time by the upper part of the body of the driver of the vehicle.

So that the hands and arms do not disturb the determination of the position of the upper part of the body of the driver of the vehicle it is advantageous to provide a sensor device for measuring the distance and speed of the upper part of the body of the driver of the vehicle in the region of the hub element 10 or in regions of the steering wheel spokes which are arranged in the direction of the hub element.

The parameters which are determined are passed on to the electronic safety system E of the motor vehicle. The electronic safety system E may be embodied as one unit with the on-board computer system or independently of it. In the illustration in FIG. 5, the parameters which are determined influence the decision as to whether, and in what way, an airbag system A is activated.

In this way, it is also possible to generate important information for the electronic safety system E of the motor vehicle. This information may be used, for example, for the decision by the safety system E as to whether the triggering of the driver's airbag by the electronic safety system E is to be prevented when a vehicle which is traveling slowly crashes. This is appropriate if there is such a short distance between the upper part of the body of the driver of the vehicle and the driver's airbag module which is arranged in the hub 10 that the risk of injury by the unfolding driver's airbag is greater than the risk of injury when the driver's airbag does not unfold. The information relating to the distance between the driver of the vehicle and the steering wheel 1 is also significant for the decision about the time when the side airbag systems are triggered.

Furthermore it is appropriate if the parameters which are determined interact with further sensors for determining the position and speed of the upper part of the body of the driver of the vehicle, in order to minimize the risk of incorrect determination of the aforesaid parameters.

Furthermore it is conceivable to determine either additionally or independently using the parameters determined and electronically sensed data relating to the setting of the driver's seat (sitting position with respect to the direction of travel, inclination of the backrest, vertical setting of the seat etc.) whether the driver's seat is located in a position too close to the steering wheel. If necessary, the electronic safety system E can issue a corresponding indication to the driver.

However, it is also self-evident for the safety system E to use the parameters which are determined, in addition to a large number of other input parameters, to control other devices which are controlled by the safety system, these being, for example, ESP Electronic Stability Program, anti-slip control, braking assistant, seatbelt pretension steering wheel and side air bags.

Together with the distance-determining system it is also possible to use the sensor devices to determine the speed with which the driver of the vehicle makes his fingertip 30 approach the functional faces 21. This parameter may also be significant for the electronic safety system E. For example, high approach speeds of the fingertip 30 to the functional faces 21 may indicated a dangerous traffic situation. In such a case, the electronic safety system of the motor vehicle may, for example, react by activating a braking assistance system.

It goes without saying that the above described embodiments of the inventive steering wheel 1 with the differently configured functional faces 21, 21', 21" can also be combined with one another.

The invention claimed is:

1. A steering wheel for a motor vehicle having a plurality of operating assemblies including a music system, an air-conditioning system, a navigation system, or a hands-free phone system, the steering wheel comprising:
a hub element;
a steering wheel rim;
at least one steering wheel spoke for attaching the steering wheel rim to the hub element; and
at least one activation device which is arranged on the hub element, on the steering wheel rim or on the steering wheel spoke and having the purpose of actively controlling or regulating a predetermined one of the plurality of motor vehicle operating assemblies,
wherein the activation device is embodied as an optical reflection sensor device, the steering wheel has a plurality or sensor devices with optical reflection functional faces which are arranged on the steering wheel rim, the steering wheel spoke, or the hub element, and the functional face of at least one sensor device is arranged in a depression in the steering wheel,
the functional face has a recessed region arranged in the lowest region of the depression and a first limb adjoining the recessed region on one side thereof and a second limb adjoining the recessed region on the other side thereof, the sensor device is embodied in such a way that a driver of a vehicle actuates a control function or regulating function of a motor vehicle assembly by tapping the functional face in the recessed region with a fingertip, the sensor device is embodied in such a way that the driver of the vehicle generates a first control signal or first regulating signal of an assembly of the motor vehicle by moving his fingertip onto the first limb from the recessed region, and the sensor device is embodied in such a way that the driver of the vehicle generates a second control signal or second regulating signal of an assembly of the motor vehicle by moving his fingertip onto the second limb from the recessed region.

2. The steering wheel as claimed in claim 1, wherein the first and second limbs of the functional face are symmetrical with respect to one another.

3. A steering wheel for a motor vehicle having a plurality of operating assemblies including a music system, an air-conditioning system, a navigation system, or a hands-free phone system, the steering wheel comprising:
a hub element,
a steering wheel rim,
at least one steering wheel spoke for attaching the steering wheel rim to the hub element; and
at least one activation device which is arranged on the hub element, on the steering wheel rim or on the steering wheel spoke and has the purpose of actively controlling or regulating a predetermined one of the plurality of motor vehicle operating assemblies,
wherein the activation device is embodied as an optical reflection sensor device that is configured for optically detecting a user's fingertip and the fingertip's movements relative thereto for actively controlling or regulating the predetermined motor vehicle operating assembly, the steering wheel having a plurality of sensor devices with optical reflection functional faces which are arranged on the steering wheel rim, the steering wheel spoke, or the hub element, at least one sensor device has a functional face which is extended along an axis (EA) of extent and is arranged on the steering wheel spoke or on the steering wheel hub, with the extent of the extended functional face being formed transversely with respect to the axis (EA) of extend in such a way that no significant movement of a fingertip of a driver of a vehicle transversely with respect to the direction (EA) of extent is possible, and a regulating function for an assigned parameter of the predetermined one of the motor vehicle operating assemblies is actuated by the user of a vehicle causing his fingertip to approach or touch the extended functional face.

4. The steering wheel as claimed in claim 3, wherein the sensor device has an optical reflection functional face that is arranged in the steering wheel rim or on the steering wheel spoke in such a way that the driver of the vehicle reaches the functional face with one of his fingertips without having to take his hand off the steering wheel rim in order to do so.

5. The steering wheel as claimed in claim 4, wherein the functional face of the one sensor device is countersunk in a transverse direction with respect to a plane extending from the steering wheel rim.

6. The steering wheel as claimed in claim 5, wherein the functional face of the one sensor device is countersunk essentially perpendicularly with respect to the plane extending from the steering wheel rim.

7. The steering wheel as claimed in claim 3, wherein the driver of the vehicle generates a switch-off or switch-on signal for a function of the predetermined motor vehicle operating assembly by tapping the functional face with a fingertip.

8. The steering wheel as claimed in claim 3, wherein a functional face of the sensor device is arranged on a bulge of the steering wheel rim projecting in the direction of the hub element.

9. The steering wheel as claimed in claim 3, wherein a functional face of the sensor device is arranged on the steering wheel in a region above an axis (D) of rotation of the steering wheel defined by the steering wheel rim in a straight-ahead position of the steering wheel.

10. The steering wheel as claimed in claim 9, wherein a functional face of a second sensor device in the region above the axis (D) of rotation of the steering wheel is arranged symmetrically with respect to the functional face of the sensor device in the straight-ahead position of the steering wheel.

11. The steering wheel as claimed in claim 3, wherein the assigned parameter of the motor vehicle assembly is increased or decreased by moving the fingertip in one or other direction along the direction (EA) of extent.

12. The steering wheel as claimed in claim 11, wherein the assigned parameter of the motor vehicle assembly is selected by speech-activated control by the user of the vehicle by means of a motor vehicle speech recognition system.

13. The steering wheel as claimed in claim 11, in combination with the motor vehicle wherein, a display or on board computer system is provided to permit the user of the vehicle to recognize the assigned parameter on the display, which is arranged on the steering wheel or in a dashboard region of the motor vehicle, or by means of a corresponding speech output of the motor vehicle on-board computer system.

14. The steering wheel as claimed in claim 3, wherein the assigned parameter is selected by the movement of the fingertip on a functional face, extended along a plurality of axes (EA1, EA2) of extent, of a further sensor device.

15. The steering wheel as claimed in claim 14, wherein the assigned parameter is selected by moving the fingertip along a second axis (EA2) of extent of the extended functional face, and the selected, assigned parameter is regulated by moving the fingertip along a first axis (EA1) of extent which is arranged essentially perpendicularly thereto.

16. The steering wheel as claimed in claim 14, in combination with the motor vehicle, wherein a selector display which is arranged on the steering wheel or in a dashboard region of the motor vehicle is provided to permit selectable assigned parameters to be visually recognized by the user of the vehicle, the movement of the fingertip on the extended functional face controlling a cursor on the selector display and the selection of a desired one of the selectable assigned parameters being possible by moving the cursor onto the one desired assigned parameter which is displayed on the selector display and subsequently tapping on the extended functional face.

17. The steering wheel as claimed in claim 3, wherein a plurality of sensor devices with functional faces are arranged on the steering wheel rim or on the steering wheel spokes in such a way that regions in which a driver of a vehicle touches or grasps the steering wheel with his hands can be detected.

18. A method using a steering wheel as claimed in claim 3, having the following steps:
- the parameters of the distance or approach speed of the upper part of the body of the driver of the vehicle in relation to the steering wheel is determined using at least one optical reflection sensor device that is different from the optical reflection sensor device that is used for actively controlling or regulating the predetermined motor vehicle operating assembly, and
- the parameters which are determined in this way are passed on to an electronic safety system of the vehicle and influence, in the event of a crash, the decision of the electronic safety system as to whether, and in what way, a steering wheel airbag or side airbags which are assigned to the user of the vehicle are triggered.

* * * * *